United States Patent [19]
Helf et al.

[11] 3,931,424
[45] Jan. 6, 1976

[54] PREFABRICATED THERMAL INSULATION STRUCTURE AND METHOD

[75] Inventors: Jack C. Helf, Los Alamitos; Frank E. Mack, Huntington Beach, both of Calif.

[73] Assignee: Rockwell International Corporation, El Segundo, Calif.

[22] Filed: Dec. 13, 1973

[21] Appl. No.: 424,519

[52] U.S. Cl. .................. 428/33; 114/74 A; 220/9
[51] Int. Cl.² ............................................ B32B 7/04
[58] Field of Search ........ 161/36, 43, 44; 220/9 LG, 220/9 F, 9 C; 52/617, 309, 620; 114/74 A; 5/352, 357; 428/33, 35

[56] References Cited
UNITED STATES PATENTS

| | | | |
|---|---|---|---|
| 3,099,362 | 7/1963 | Schlumberger | 220/9 LG |
| 3,112,043 | 11/1963 | Tucker | 220/15 |
| 3,196,622 | 7/1965 | Smith et al. | 220/9 LG |
| 3,230,681 | 1/1966 | Allen et al. | 161/37 |
| 3,319,431 | 5/1967 | Clarke et al. | 114/74 A |
| 3,367,492 | 2/1968 | Pratt et al. | 220/9 F |
| 3,367,527 | 2/1968 | Darlington | 220/9 F |
| 3,411,656 | 11/1968 | Jackson | 114/74 A |
| 3,502,239 | 3/1970 | Worbogs et al. | 114/74 A |
| 3,525,661 | 8/1970 | Jackson | 161/43 |
| 3,757,982 | 9/1973 | Isenberg et al. | 220/9 LG |

*Primary Examiner*—William E. Schulz

[57] ABSTRACT

An insulation system for marine tanker or land based liquid natural gas containers is formed in prefabricated modules bolted to an inner wall of the container. Adjacent modules are connected to provide a continuous insulation, liquid barrier and tension membrane. The confined liquid is in contact with a layer of closed cell polyurethane foam that incorporates means for relieving thermal stresses. The liquid tight primary foam layer is backed by a liquid tight fiberglass tension membrane and an additional layer of polyurethane foam. The fiberglass membrane is connected to cruciform fittings in the tank corners for reaction of contraction induced tensile forces. Handling and installation of the system is simplified by prefabricating the several layers of insulation and fiberglass membrane with a plywood panel supporting the system and providing an interface with the inner hull of the ship or inner tank surface. Damage and leak detection sensors are incorporated in the module at the membrane.

11 Claims, 17 Drawing Figures

PREFABRICATED THERMAL INSULATION STRUCTURE AND METHOD

RELATED INVENTIONS

The present invention is an improvement on the copending application of Helf and Mack for Thermal Insulation With Relief of Thermal Stress, Ser. No. 286,512, filed Sept. 5, 1972, and the copending application of L. Isenberg and E. T. Hillberg for Thermally Insulated Container, Ser. No. 152,125, filed June 11, 1971 and now U.S. Pat. No. 3,757,982. Both of these copending applications are assigned to the assignee of the present application and the disclosures of both are specifically incorporated herein by this reference as though fully set forth.

BACKGROUND OF THE INVENTION

The present invention relates to insulation systems and more particularly concerns multilayer systems embodying prefabricated modules.

Cryogenic liquids, particularly liquified gases, have been stored and transported for many years. Such materials must be confined under great pressure if at ambient temperatures, or must be maintained at cryogenic temperatures if confined near atmospheric pressures. The cost and dangers inherent in high pressure containers of large volume provide the cryogenic container with significant advantages. Accordingly, thermal insulation systems have been utilized in containers for storage and transportation of liquified gases.

Multilayer cellular foam insulation, cork, pearlite, fiberglass, cellular rubber, cellular glass and many other materials, have been employed in cryogenic containers. Several criteria are of primary importance in the selection of insulation systems. A first one of such criteria is low thermal conductivity and a second is adequate mechanical strength. A third criterion is ease of fabrication and installation. The latter is economically significant because even a small decrease in unit cost of installation can result in substantial savings over the literally acres of insulation that may be required for a liquid natural gas tanker.

The cellular foams, and in particular, urethane foam, are among materials having lowest thermal conductivity. Thus, in the aforesaid patent of Isenberg and Hillberg, there is disclosed a system making use of the exceedingly favorable thermal characteristics of the urethane foam and, in addition, meeting requirements of various laws and regulations. Such laws and regulations are, in general, concerned with safety of large containers of the potentially dangerous liquified gases. Because of the high risks involved, both primary and secondary liquid barriers are required, and in addition, suitable means must be provided to detect and warn of damage or leak. Thus, the system of the Isenberg and Hillberg patent employs a liquid barrier membrane between plural layers of foam insulation and includes a system for monitoring leakage. The Isenberg and Hillberg system provides significant economies with respect to prior foam systems, since the latter generally required the mounting of the foam within rigid protective structural shells prior to installation. Such shells have been required for dimensional stability and to form both liquid and vapor tight barriers. This type of insulation system is described in the several patents assigned to Esso Research and Engineering Company, Nos. 3,341,051, 3,381,843, 3,341,050, 3,363,796 and 3,339,780.

Although polyurethane foams provide efficient insulation systems in temperature ranges between +200°F. and —100°F., they become brittle and exhibit poor mechanical properties at cryogenic temperatures in the range of —150°F. to —452°F. Further, they are subject to widespread surface cracking and structural failure. Thus, the copending application of Mack and Helf for Thermal Insulation With Relief of Thermal Stress, Ser. No. 286,512 discloses a modification of the system of Isenberg and Hillberg in which the inner layer of foam isulation is formed with stress attenuating discontinuities thereby avoiding surface cracking failures. In one arrangement of the discontinuities, the innermost layer of insulation, namely, that which is in contact with the confined liquified gas, is formed by a number of edge-to-edge blocks having barrier strips mounted at the joints between adjacent blocks to provide a primary liquid barrier.

The application of urethane foam whether poured or sprayed in place, or preformed in blocks that are bonded in place, requires careful and precise control of many conditions and parameters including careful environmental control. Various factors, such as humidity, temperature and air borne contaminants, must be carefully controlled in the application of urethane adhesives and in the formation of the urethane foam itself. Where the insulation is to be applied to and within the hold of a tanker forming several containers, each in the order of 100 × 120 feet by 80 feet high for example, significant problems may be encountered in the control of these environmental parameters. Accordingly, it is preferable to perform as much of the manufacture and assembly of the systems as possible in a shop where greater control and precision of operation is possible.

It is an object of the present invention to provide improved insulation systems and methods that decrease time and effort required for installation without degradation of operation of the system.

SUMMARY OF THE INVENTION

In carrying out principles of the present invention in accordance with a preferred embodiment thereof, an insulation system module is formed by bonding a first layer of insulation to a module support structure to form a first sub-assembly, bonding a liquid impervious tension membrane to an array of adjacent insulation blocks assembled in edge-to-edge relation with liquid barriers at the joints thereof to form a second sub-assembly, bonding the two sub-assemblies together to form a self-support laminated module, and attaching a plurality of such laminated modules to the surface to be insulated in a side-by-side relation with the module support structure forming an interface between the insulation and liquid barrier layers on the one side and the insulated surface on the other.

DETAILED DESCRIPTION

Figure 1:
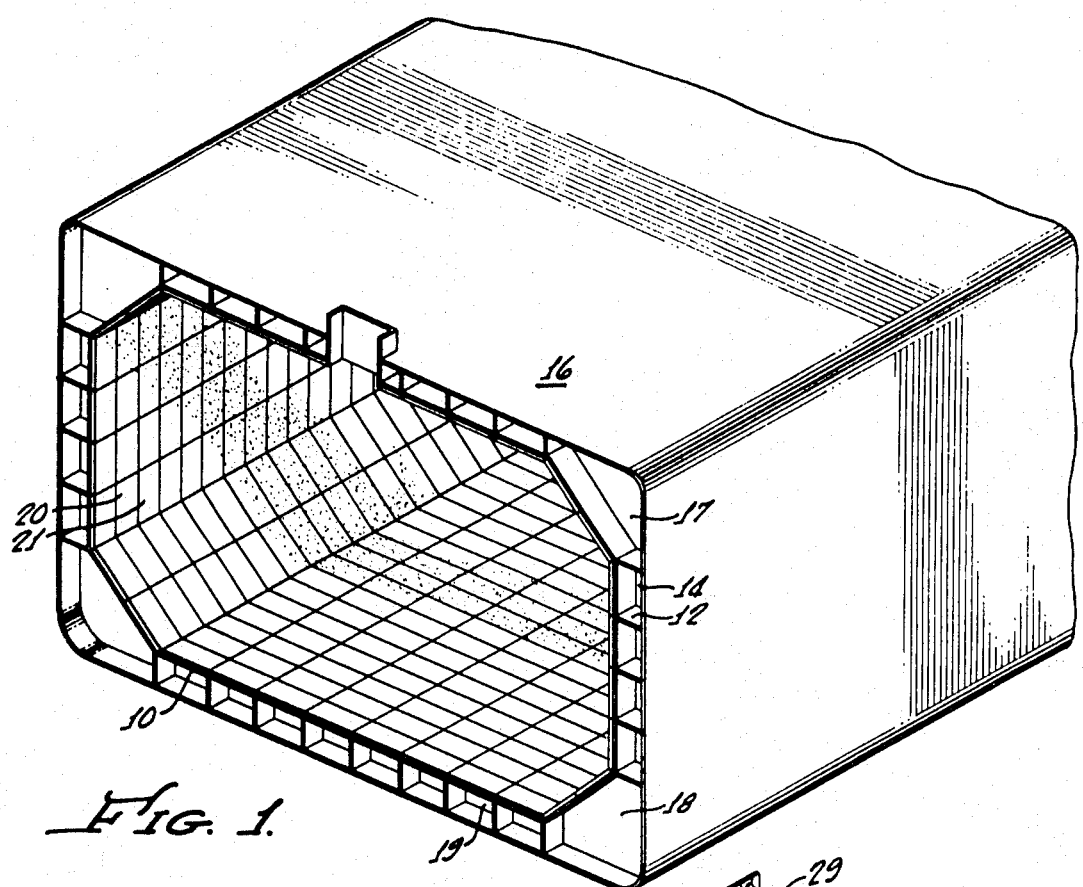
FIG. 1 is a perspective view of a section of part of a marine tanker container showing an insulation system installed in accordance with the present invention.

Illustrated in FIG. 1 is a schematic representation of a transverse mid-section of a marine tanker having a cryogenic container formed in its cargo hold. The inner hull or cargo tank structure comprises the inner bottom 10, longitudinal bulkheads 12, transverse bulkheads 14, and tank top 16. Wing tanks 17, 18 and the double bottom 19, may be flooded for ballast purposes or in case of leakage from the cargo tank. The inner hull defines the shell of a cryogenic container in which low temperature liquids, such as, for example, a liquified natural gas at a temperature of about −260°F. (−126.7°C.), are to be carried at or about atmospheric pressure.

The tank is provided with an insulation system in the form of a plurality of insulation panels or modules 20, 21 etc., attached to the inner surface of the tank in side-by-side relation as illustrated in FIG. 1. Joints between adjacent modules are filled by closeout strips, not shown in FIG. 1, but more particularly described below.

Figure 2:
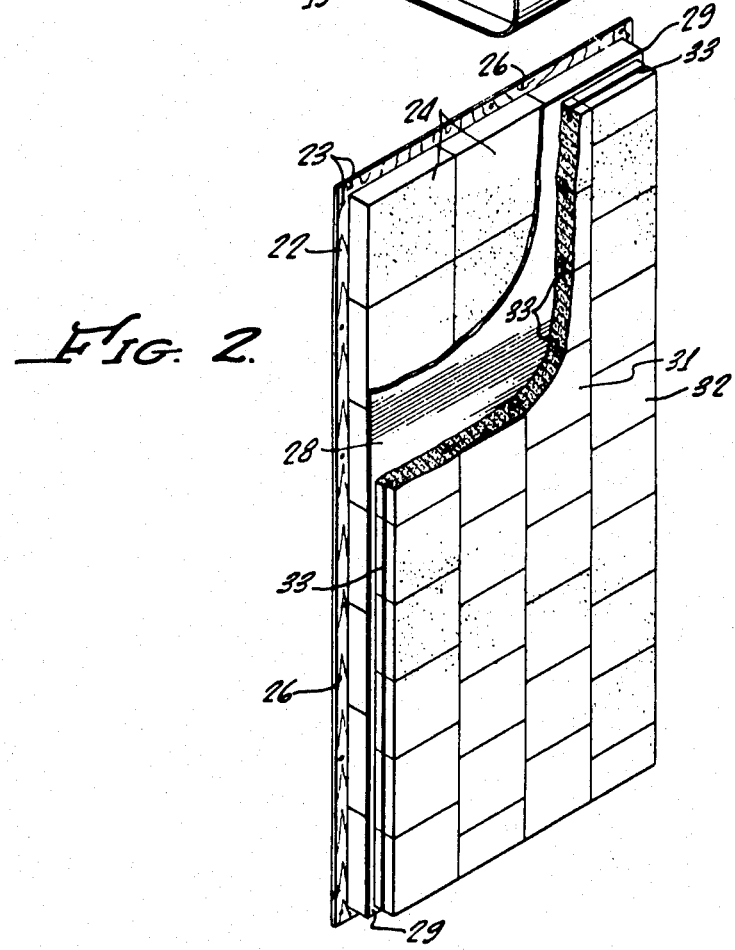
FIG. 2 is a perspective view of a single module, with parts broken away.
Figure 3:
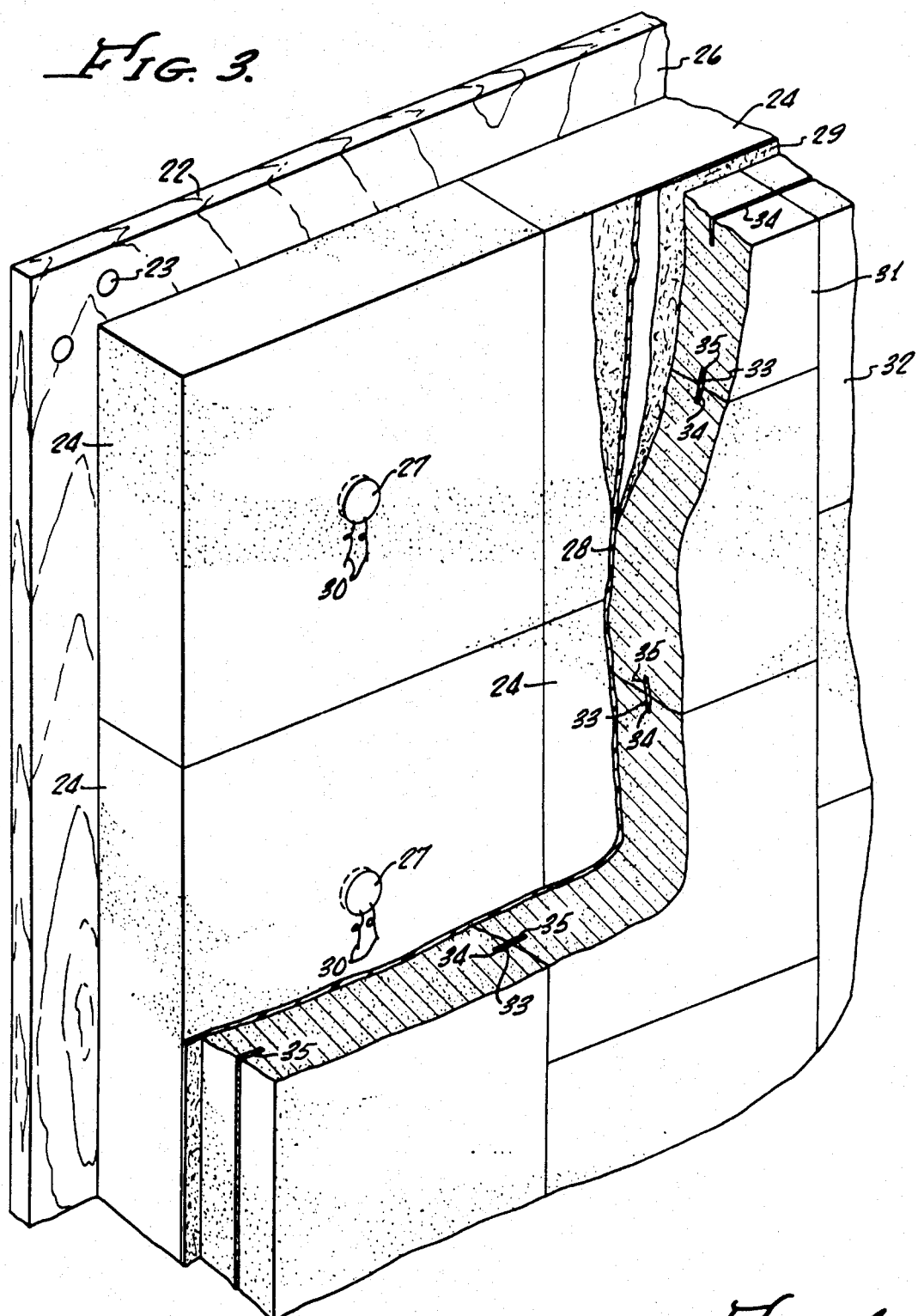
FIG. 3 is an enlarged fragmentary view of a module showing one type of joint barrier.

As illustrated in FIGS. 2 and 3, a typical one of the identical modules is a self-contained and self-supporting structural unit that is readily fabricated at a location remote from the container, easily handled and transported to the container, and simply and quickly attached to the inner surface of the container. Preferably, the module is made as large as possible, the size being limited primarily by the size of the hatch through which the modules must be transported for installation. Another factor constraining choice of module size is availability of panels or sheets of material in larger sizes. Accordingly, a module size preferred at present employs a module or panel support structure in the form of a rigid sheet of plywood 22, 5 feet by 10 feet by 1 inch thick.

The module support structure 22 has its flange formed with a plurality of holes 23 adapted to receive bolts (not shown in FIG. 2 and 3) that are fixed to and project from the inner surface of the container for rapid and simple mechanical attachment of the module.

A first or outer layer of insulation 24 formed of a closed cellular foam is bonded to the support structure 22 and has slightly smaller dimensions than the support structure to provide a flange 26 extending around the entire periphery of the module. A tension and secondary barrier membrane 28 is bonded to the inner surface of the outer insulation layer 24 and sensors 27 and leads 30 of damage and leak detection systems, are installed in the layer 24, preferably adjacent the membrane 28.

Membrane 28 not only forms a secondary liquid barrier but also forms a tension member that resists the tension forces induced by contraction of the insulation upon exposure to the cryogenic temperature. The tension and barrier membrane 28 may be formed of many different types of liquid-impervious materials, including aluminum or other metals, but a laminate of resin impregnated fiberglass cloth is preferred. In an exemplary embodiment, six layers of glass cloth, each having a thickness of 0.010 inches and each impregnated with a resin, are laminated to form a strong liquid-impervious sheet having dimensions conforming to the dimensions of the outer insulation layer 24.

An array of blocks 31, 32, etc., forming the inner layer of insulation covers an extent somewhat less than the extent of the membrane 28 to provide a peripheral membrane flange 29 to be used for splicing the membrane to corresponding membranes of adjacent modules. Blocks 31, 32, etc., are formed of a closed cellular foam and arranged in an edge-to-edge array. The blocks are bonded to the membrane 28 but adjoining side edges of adjacent blocks are not bonded to each other. Accordingly, an expansion joint between adjacent blocks is provided and a liquid-impervious barrier is formed in such joints by means of barrier strips 33 positioned in mutually facing and mating grooves 34, 35 that are formed in side edges of adjacent blocks at a distance from the innermost surface of the inner layer of insulation. The blocks are free to contract and move apart slightly at the joints but passage of liquid to the membrane 28 remains blocked by the expansion joint barrier strips. As liquid approaches the barrier strips, its temperature rises, it vaporizes, and resulting gas is trapped in the relatively narrow joints. Since the trapped gas is a better insulator than the liquid form of the confined material, adequate insulation remains.

Figure 4:
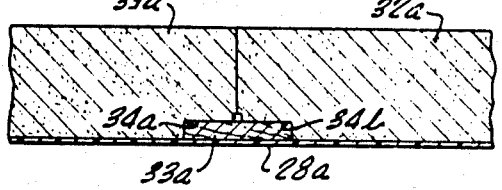
FIG. 4 shows a modified form of module joint barrier.

Illustrated in FIG. 4 is a modified form of expansion joint in which grooves 34a and 34b are formed as mating rabbets in adjoining edges of adjacent blocks such as blocks 31a, 32a. The rabbets are formed at the block surface that is bonded to the tension and secondary barrier membrane 28a. A barrier strip, such as a dense foam or wood strip 33a is positioned in the mating rabbets and securely bonded to the blocks 31a and 32a and to the membrane 28a, throughout its contact with these elements. Thus, a liquid-impervious bond, formed by the adhesive bonding material, extends completely across the expansion joint formed between the adjacent blocks and prevents any liquid from contacting the secondary liquid barrier 28a. The foam blocks 31a, 32a, etc., are themselves impervious to liquid but are merely in side-by-side abutment, not being bonded to one another. The blocks of the inner layers (of the embodiments of both FIGS. 3 and 4) are connected and sealed to each other only by means of the joint barriers. Thus temperature induced contraction of the blocks will tend to open a narrow space wherein the liquid vaporizes and is trapped to form a pocket of insulating gas between adjacent blocks of the inner layer.

Figure 5:
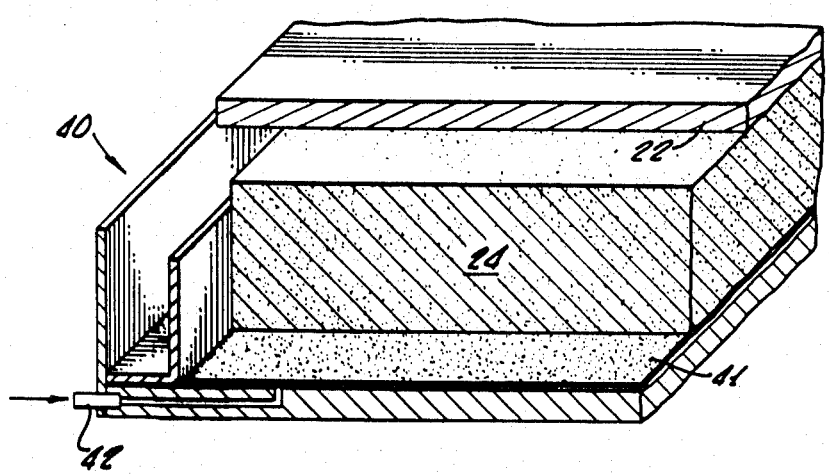
FIG. 5 is a sectional view of the sub-assembly of part of the module showing the module support structure and first layer of insulation enclosed in a pressure bonding tool.

The plurality of modules, each identical to that heretofore described, are preformed, preferably by forming first and second sub-assemblies. A first sub-assembly is formed of the module support structure of plywood sheet 22 and the first or outer insulation layer 24. The outer insulation 24 is formed of a plurality of blocks having a size, for example, of 16 by 16 inches by 4 inches thick and formed of a polyurethane foam of from 4 to 8 pounds per cubic foot density. While it may not be necessary to form the outer insulation of a number of blocks, nevertheless, a group of blocks is easier to form and handle than a single 5 foot by 10 foot foam sheet. Blocks 24 of the outer layer are formed in an array of side-by-side blocks having a coplanar surface. This surface and the mating surface of the module support structure 22 are coated with a suitable adhesive, placed in a bonding tool 40 and subjected to pressure until the adhesive is cured. Uniform pressure is applied to the outer surfaces of the sub-assembly during curing by means of a bladder or a flexible container 41 that is pressurized via a fitting 42 to exert a uniform pressure over the entire surface of the sub-assembly as shown in FIG. 5. The plywood 22 is secured to the tool 40 to hold the sub-assembly in position.

Figure 6:
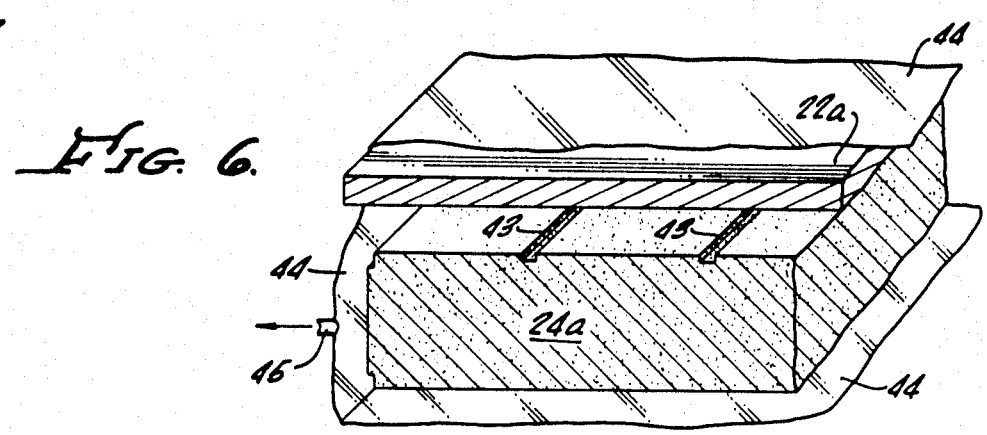
FIG. 6 is a section of a sub-assembly of part of the module support structure and first insulation layer showing a vacuum bonding fixture.

Alternatively, the sub-assembly with contacting adhesively coated surfaces may be placed in a vacuum bag that is evacuated to provide a uniform atmospheric pressure over the sub-assembly surfaces. Where vacuum tooling is employed, as shown in FIG. 6, a pattern of vent or air bleed grooves 43 is formed on the surface of the array of outer insulation blocks 24a to insure evacuation of air from all surfaces to be bonded. The vacuum tooling comprises a flexible air-tight bag 44 that entirely surrounds the sub-assembly of plywood sheet 22a and blocks 24a and which is evacuated via a fitting 45.

Figure 7:
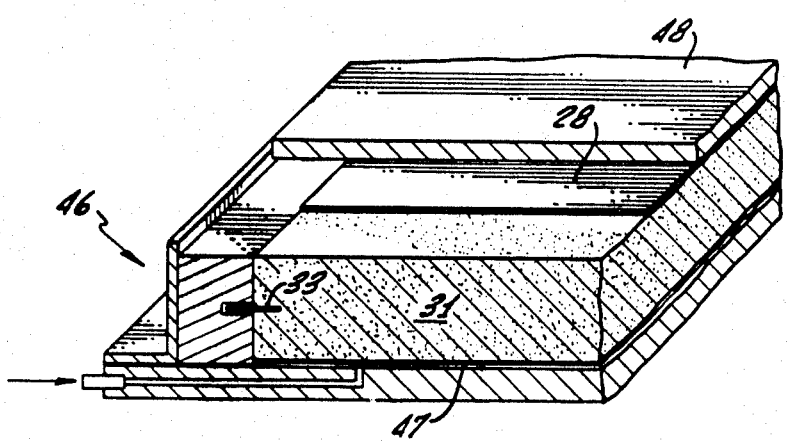
FIG. 7 is a section of a second sub-assembly of tension membrane and inner insulation layer with one type of liquid barrier joints, showing a pressure bonding tool.

A second section or sub-assembly of the module is formed by assembling an array of the blocks 31, 32, etc., the second layer of insulation. In an exemplary embodiment, stress attenuation is achieved by making these blocks 12 inches by 12 inches by 3 inches thick, cutting the grooves 34, 35 therein and inserting the barrier strips 33 into mating grooves (FIG. 3) as the array of blocks is assembled. The surfaces of the blocks of the array are then coated with an adhesive and the adhesively coated membrane 28 is assembled to the array. This sub-assembly is mounted in a bonding tool 46 and pressurized until cure is achieved. The pressurized bonding tool 46 may include a pressurized bladder 47 and pressure plate 48 as illustrated in FIG. 7. Alternatively, as shown with the alternate embodiment, the second sub-assembly is fabricated by a vacuum bonding tool employed in the manner previously described in connection with FIG. 6. This vacuum tool includes a flexible air-tight bag 44a entirely surrounding the sub-assembly of blocks 31a, membrane 28a and barrier strips 33a and 33b. The bag is evacuated via a fitting 45a.

For the assembly of the second layer of insulation in the embodiment illustrated in FIG. 4, the blocks 31a and 32a are first formed with rabbets 34a and 34b and assembled in the array. Then a plurality of barrier strips 33a are positioned within the mating rabbets after the respective contacting surfaces of blocks and strips are coated with adhesive. At the periphery of each array of blocks 32a and 31a, barrier strips 33b are positioned to extend outwardly around the array (see FIGS. 8 and 9) for bonding to insulation blocks of a closeout strip, to be more particularly described below.

Where vacuum bonding techniques and tooling are employed, a pattern of vent grooves 43a are cut in the array of blocks, preferably after assembly of the blocks with the barrier strips 33a, 33b. Then the entire surface of the blocks and strips are coated with adhesive, mated with an adhesively coated surface of membrane 28a and pressurized in the vacuum bonding tool until the adhesive is cured. One of the critical bonds of the module is that between the secondary liquid barrier membrane 28 or 28a and the mating surface of the inner insulation layer and between the membrane 28a, and barrier strips 33a and 33b. Accordingly, the membranes 28 and 28a preferably are made transparent, or at least translucent, to enable visual inspection of the bond and ready determination of the presence of any voids in the bonding.

Where damage or leak detection is to be employed, the inner surface of the first insulation layer 24, that is, the surface thereof that is to contact the membrane 28, may be formed with suitable grooves or cutouts to receive the sensors and their electrical connection. The sensors may be of any suitable type, such as thermocouples, thermistors or capacitive devices.

The two sub-assemblies of the module have the facing surfaces thereof, the inner surface of the first insulation layer 24 and the outer surface of the membrane 28, coated with adhesive and the two sections are joined in a pressure of vacuum bagging tool. If vacuum bagging is employed, suitable venting grooves are formed in an appropriate pattern on the inner surface of the first insulation layer 24 to insure proper bonding. Now the panels are ready for transportation to the container and mounting to the container wall.

In installation of the modules, a template is made to allow installation of module attachment bolts to the inner hull or container structure at positions in registration with the apertures 23 formed in the flanges 26 of the several modules. Accordingly, the bolts are installed and appropriately fixed to the inner surface. A number of modules are installed in side-by-side relation and fixedly secured in place by insertion of the bolts through the holes 23 of the module support structure flange and emplacement of nuts on the bolts Although the bolting arrangement illustrated is preferred, it will be readily appreciated that other arrangements for mechanically fastening the modules to the container walls may be employed. The mechanical attachment, of course, needs no environmental or other parameter control, requiring only the conventional priming coat on the container surface and conventional techniques for fixing the bolts to the container. Preferably, the modules are installed in rows, one or two rows at a time, before the bolts for subsequent rows of modules are affixed to the container. Accordingly, after installation of one or two rows of modules, actual dimensions of the container may be rechecked and position of the modules to be installed may be slightly adjusted so as to accomodate dimensional tolerances of the container. That is, the positions of bolts for succeeding modules are adjusted so as to account for deviations of the actual container dimension from a nominal dimension. All but a few of the modules are made identical to each other and the same size. Those modules at end portions or irregular sections of the container are specifically formed to mate with such unique container configuration.

Figure 10:
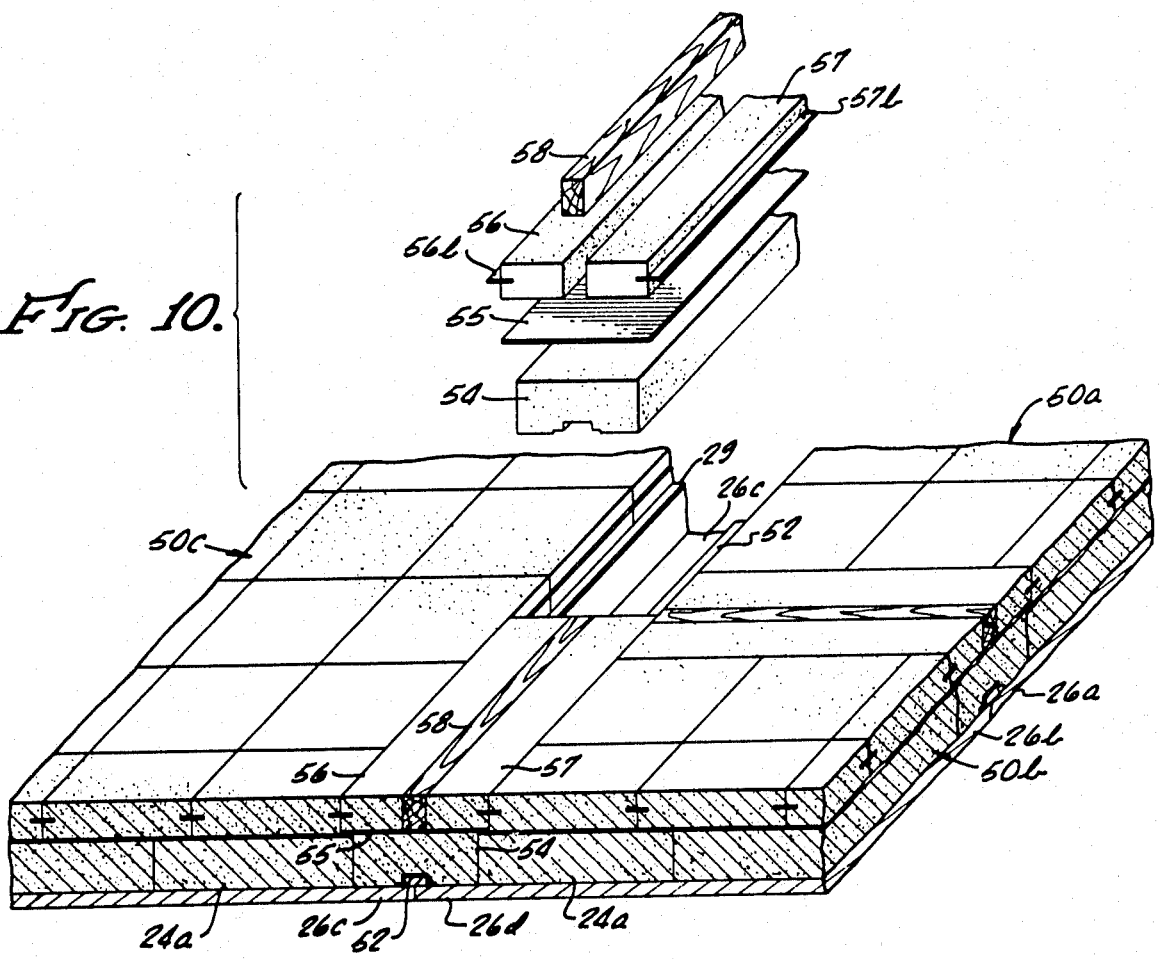
FIG. 10 illustrates a junction of three modules and closeout strips, showing elements of one closeout in exploded relation.

A plurality of installed modules may meet at an intersection as illustrated in the exemplary showing of FIG. 10. Thus, modules 50a, 50b and 50c are fixed to the container surface with flanges 26a, 26b, 26c and 26d of the module support structures in edge-to-edge relation. The space between the first and second insulation layers of the several modules must be filled with suitable insulation. Further, the secondary liquid barrier must be completed to continue the liquid seal throughout the extent of the several modules and across the joints between them, and provision must be made to transmit tensile forces in the membrane of one of the modules to the membrane of other modules. These functions are provided by the closeout strip which is installed and configured as illustrated in FIG. 10. Initially, a harness depicted at 52 and connecting the various sensor leads of the damage and leak detection system is mounted to the module support structure at the joint thereof and the harness carried to a suitable output device (not shown). An outer layer closeout block 54 is formed of a material identical with or compatible with the blocks 24a of the first layer of the installed modules. This closeout block is cut to size at the installation site, coated with adhesive and bonded in bridging relation to and between a pair of adjacent modules. A membrane splice 55 is then cut to size and bonded to the peripheral flanges 29 of adjacent panels. A pair of foam blocks 56, 57 with closeout splines inserted are cut at the site to a collective width less than the distance between the second layer of insulation of adjacent modules. Blocks 56, 57 with closeout splines 56b, 57b are then inserted between the adjacent second layers of insulation and bonded thereto and to the membrane splice. The closeout strip is then completed by the insertion of a finish strip 58 of foam or balsa wood, for example, also bonded on all of its contacting surfaces.

The closeout strip is cut at the site after installation of adjacent modules, and accordingly may be cut to accomodate variations in the relative spacing between the modules required to account for dimensional tolerances of the container itself.

Figure 8:
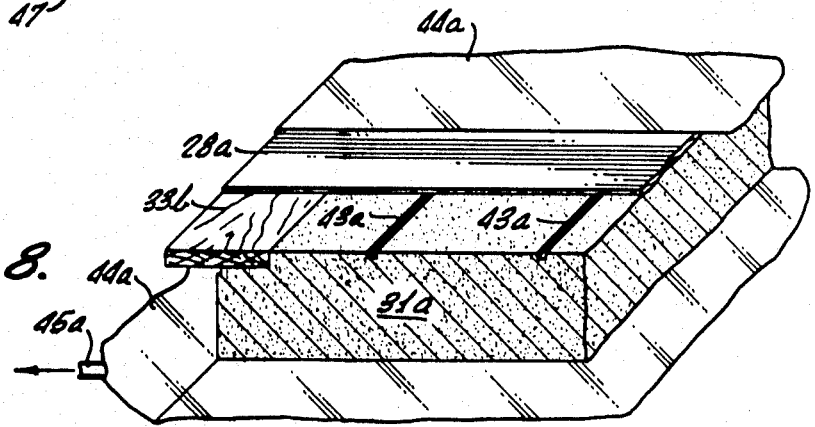
FIG. 8 is a section of a second assembly of tension membrane and inner layer of insulation with another type of joint barrier, showing a vacuum bonding fixture.
Figure 9:
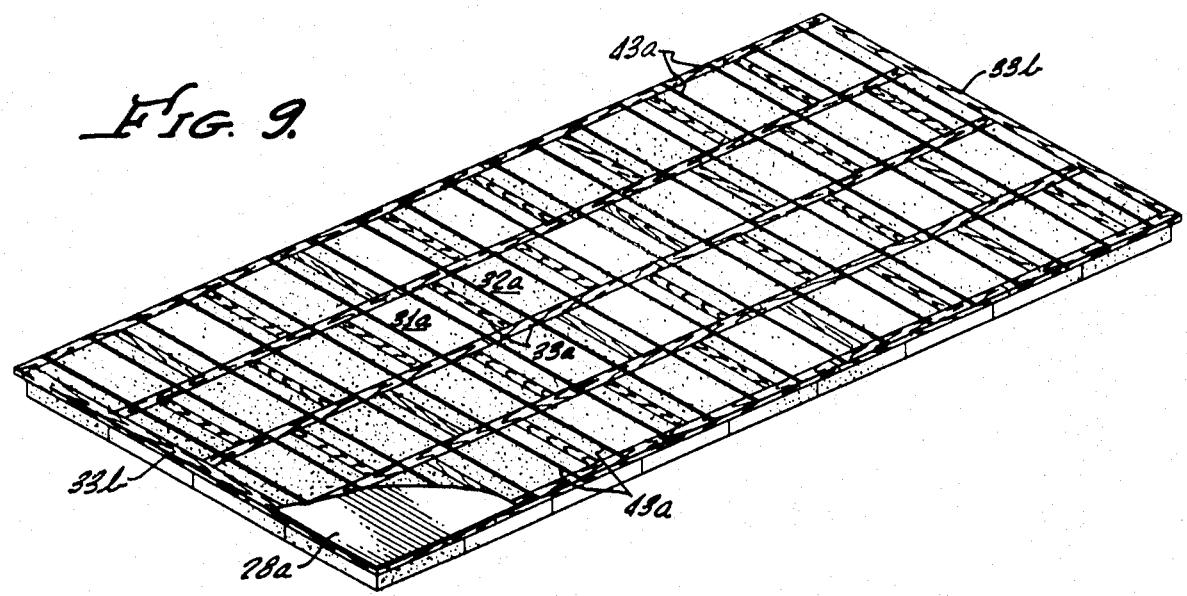
FIG. 9 is a perspective view of the outer surface of the sub-assembly of FIG. 8.
Figure 11:
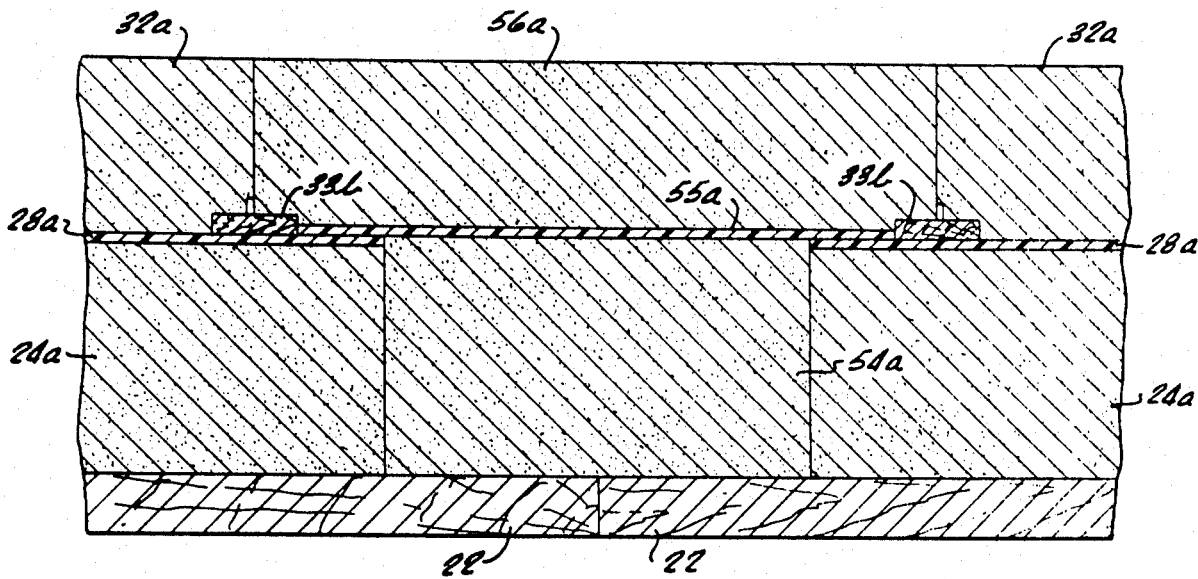
FIG. 11 illustrates a sectional view of a closeout strip for an embodiment of the insulation system employing the joint barrier of FIG. 4.

Illustrated in FIG. 11 is a closeout arrangement for adjacent modules of the type illustrated in FIGS. 4, 8 and 9. In this arrangement, a first foam closeout strip 54a is cut to a width exactly equal to the width between blocks 24a that are bonded to the module support structures 22 of adjacent modules, and the strip 54a is bonded to the respective contacting surfaces. The thickness of strip 54a is such as to make the inner surface thereof essentially flush with the inner surface of the membranes 28a of the modules installed on either side of the closeout strip. A fiberglass splice 55a is also cut on the site and bonded to the adjoining fiberglass membranes 28a of adjacent modules and to the peripheral outwardly extending barrier strips 33b thereof. The third element of this simplified closeout assembly is cut to a width precisely equal to the distance between blocks 32a of adjacent modules and also formed with rabbets on either side thereof mating with the rabbets of the adjacent inner insulation layer blocks. Again, all contacting surfaces except the abutting side edges (which form the narrow expansion joint), are adhesively coated and bonded. Thus, the peripheral barrier strips 33b bridge the joint between block 32a of the inner layer of insulation and the inner block 56a of the closeout strip to provide a liquid seal across the joint. The fiberglass splice 55a transmits tensile load between the strips 28a of adjacent modules and furthermore, completes the liquid impervious secondary barrier formed by the fiberglass membranes.

The inner blocks 32a are illustrated in FIG. 11 as including portions of the grooves formed in the outermost edges for reception of adhesive forced from between contacting surfaces during bonding.

If deemed necessary or desirable, the closeout strip 54a may be made in the same thickness as the outer insulation blocks 24a and a filler strip (not shown) of foam, wood, pressed board or the like may be interposed between the fiberglass splice 55a and the outer closeout block 54a. To increase the strength of attachment of the fiberglass splice in the presence of large tensile loads, mechanical connections, such as rivets, may be employed in addition to or instead of the adhesive bonding thereof to the fiberglass membrane 28a. Where rivets are employed, an additional filler insert of wood, pressed wood or fiberglass, having suitable grooves to receive the rivet heads, may be interposed between the inner closeout block 56a and the fiberglass splice 55a. In such a case, the under surface of the inner closeout block 56a may be completely planar and no rabbets in the surface of the inner closeout block may be required.

Figure 12:
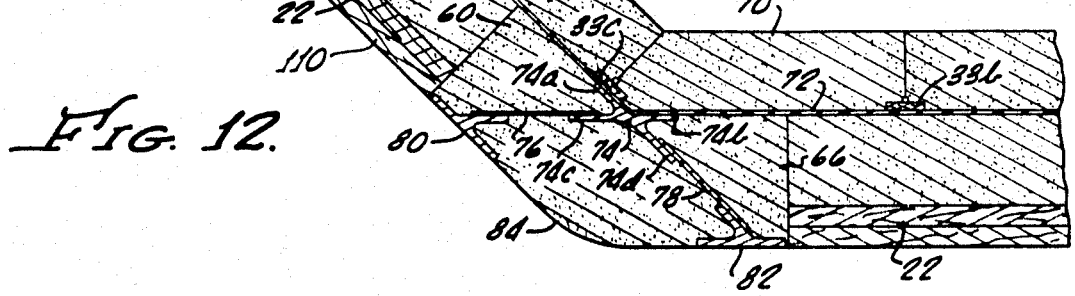
FIG. 12 illustrates one form of corner fitting for connection of the tension membrane.

Illustrated in FIG. 12 is a cruciform fitting for transmission of tension loads between the fiberglass tension membranes and the inner structure of the container. In this arrangement, a first module at the corner includes an outer corner closeout foam block 60, an inner corner closeout foam insulation block 62, and an interposed fiberglass membrane 64. At the other wall forming the corner, there is an outer foam insulation closeout block 66, an inner foam insulation closeout block 70 and an interposed tension and liquid barrier membrane 72. A cruciform fitting 74 has first and second legs 74a, 74b securely bonded and sealed to the membranes 64, 72 and third and fourth legs 74c, 74d connected by means of tension members 76, 78 to brackets 80, 82, that are fixedly secured to the inner surface 84 of the container. The illustrated arrangement may be used at corners wherein the walls make angles other than that illustrated, including 90° angles. The joint between closeout block 62 and 70 is formed substantially in the same manner as are the joints between other adjacent blocks of the inner insulation layer and includes mating rabbets in which are mounted a liquid-impervious barrier strip 33c bonded to the several contacting surfaces. As indicated in FIG. 12, module support sheets 22 may be spaced from the inner surface of the container by suitable standoffs, such as wood stringers 110 and suitable filler material to facilitate positioning of the modules with surfaces all substantially coplanar with one another.

Figure 13:
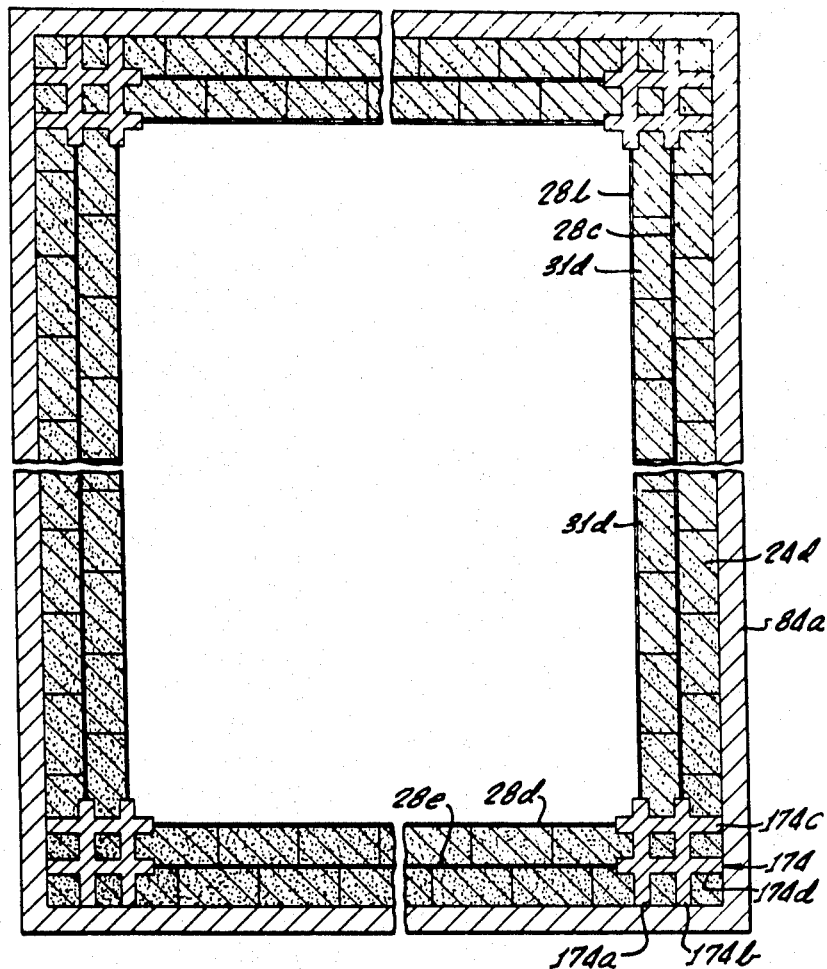
FIG. 13 illustrates an alternate arrangement of corner fitting for a system embodying a pair of tension membranes.

Illustrated in FIG. 13 is a modified form of corner cruciform corner fitting for use with modified insulation system. This modified system may be formed of prefabricated modules or may be formed of blocks and layers assembled in place, as described in the above-identified copending applications. This system includes an outer layer of closed cellular foam blocks 24d secured to the wall 84a of a container to be insulated. An inner layer of closed cellular blocks 31d is sandwiched between first and second liquid impervious tension membranes 28b and 28c. Membrane 28c is bonded to and interposed between both layers of foam blocks to form a secondary liquid barrier, and membrane 28b is bonded to the inner surface of the inner layer of blocks 31d to form a primary liquid barrier. In this arrangement, a double cruciform fitting 174 is provided having fist and second parallel legs 174a, 174b fixedly connected between the container wall and the fiberglass tension membranes 28b, 28c, respectively. The cruciform fitting 174 includes third and fourth legs 174c and 174d connected between the container wall and first and second tension and liquid barrier membranes 28d and 28e of an insulation system mounted to the other wall at this corner of the container. It will be appreciated that the fitting 174, like the fitting 74 of FIG. 12, has a cross section of cruciform configuration and extends parallel to the container corner (in a direction normal to the plane of the paper) for the full length of the insulation system.

The insulation system of FIG. 13 may have the several layers thereof bonded to each other or unbonded, thus allowing a relatively inexpensive inner liquid barrier with available materials and a high safety factor. The use of fiberglass in this system and in those previously described herein offers many advantages since this material is not subject to corrosion or chemical attack, is non-flammable, possesses low contraction, low thermal conductivity, high elasticity and yield strength and good bondability to the other materials of the system.

Figure 14:
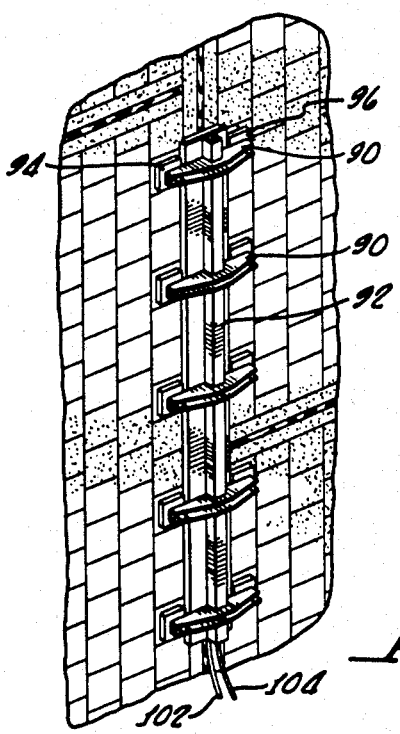
FIGS. 14 and 15 illustrate a tool for use in bonding of the closeout strips.
Figure 15:
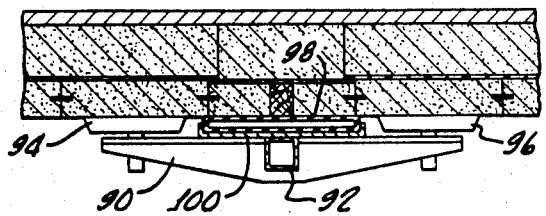
Figure 1:
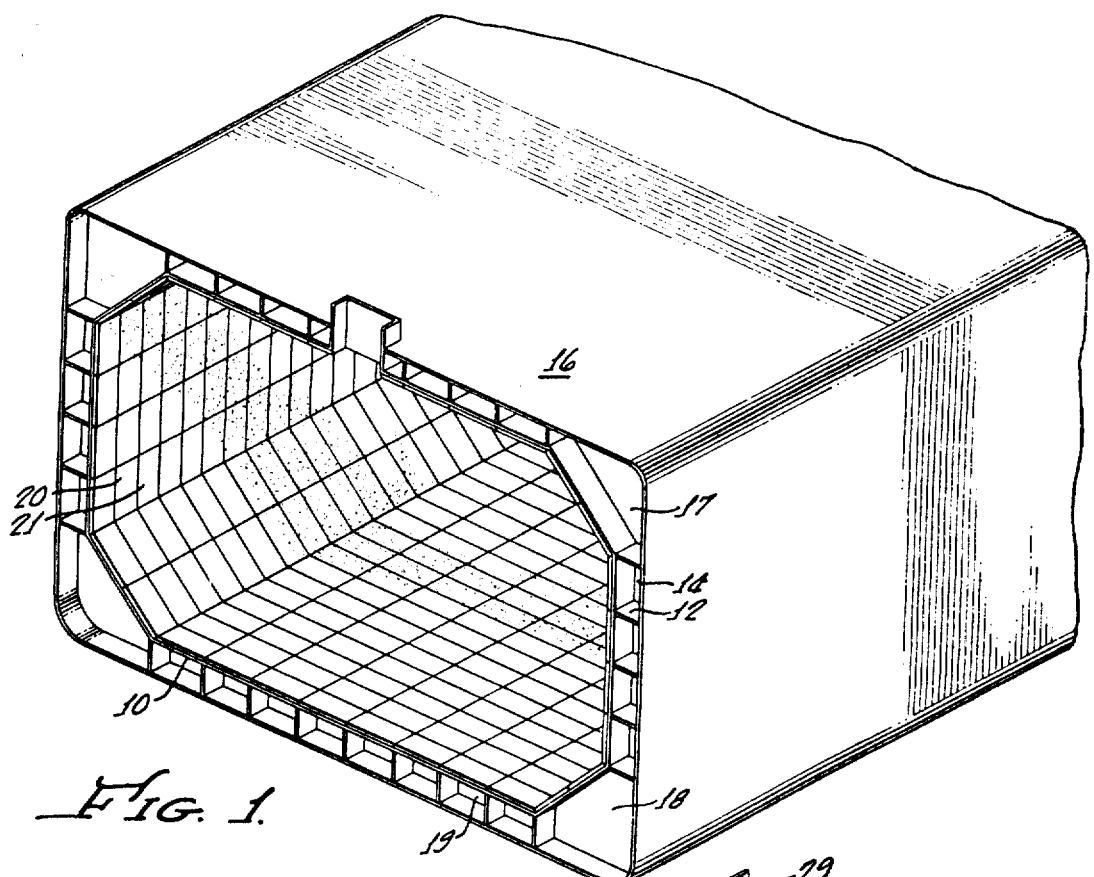
Figure 2:
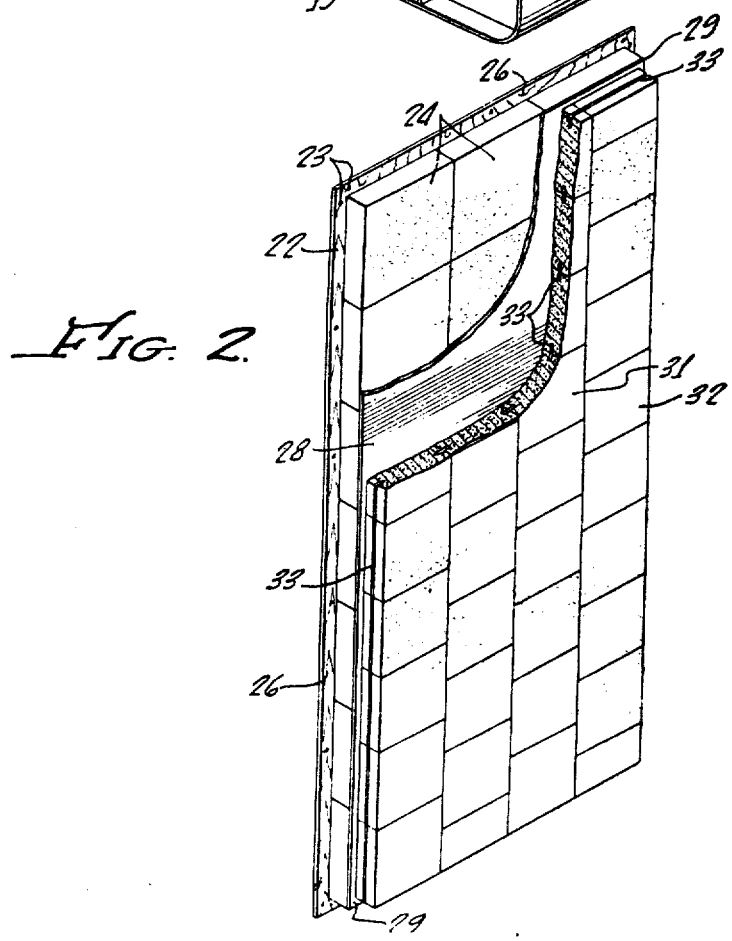
Figure 3:
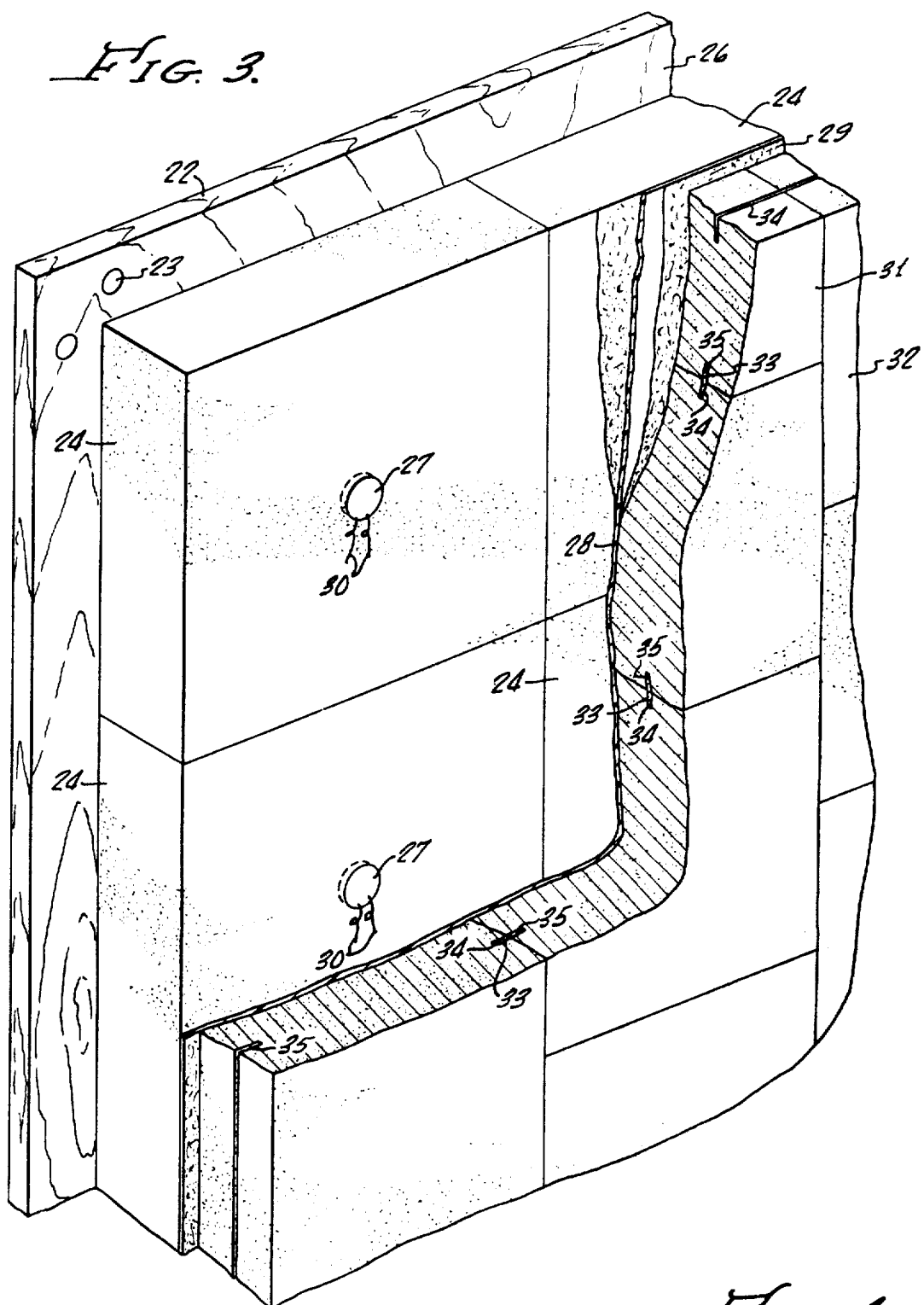
Figure 4:
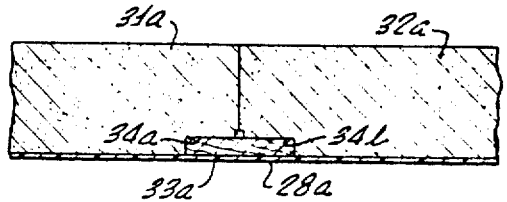
Figure 5:
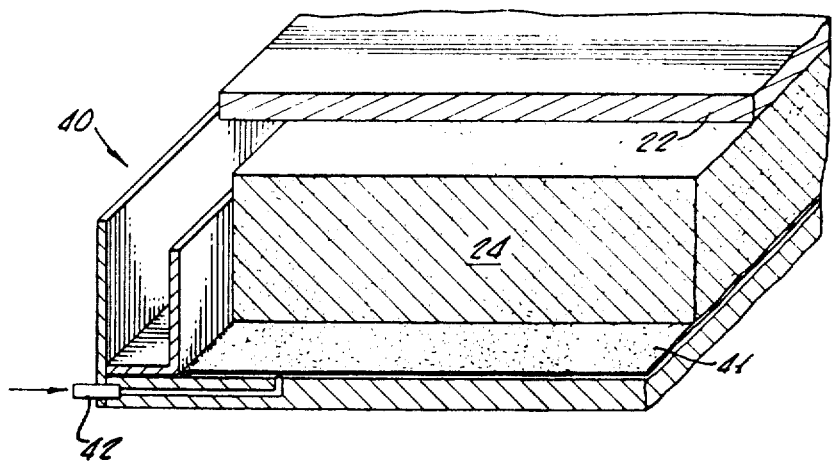
Figure 6:
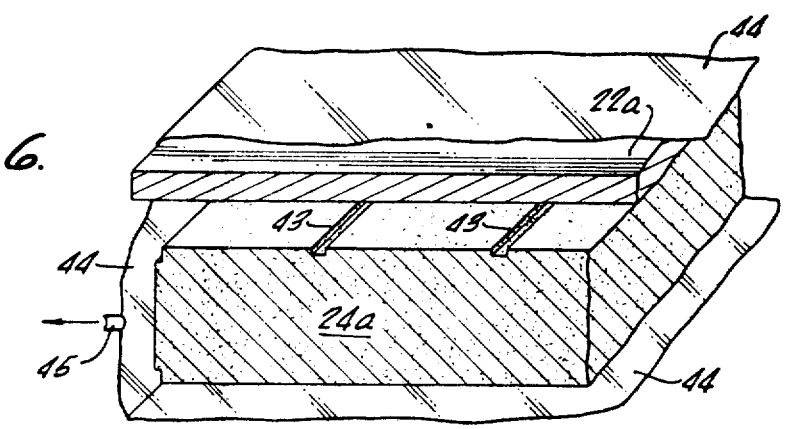
Figure 7:
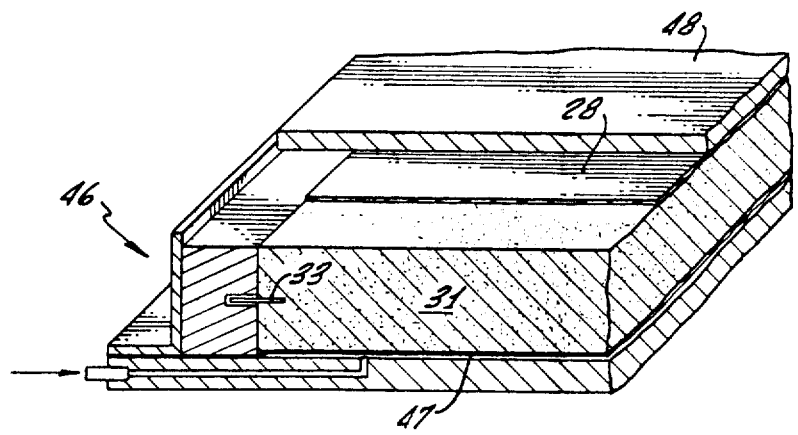
Figure 8:
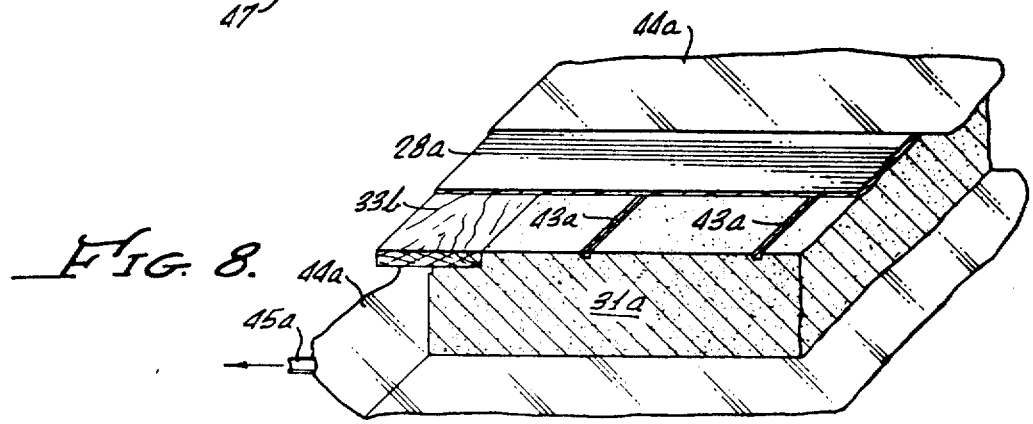
Figure 9:
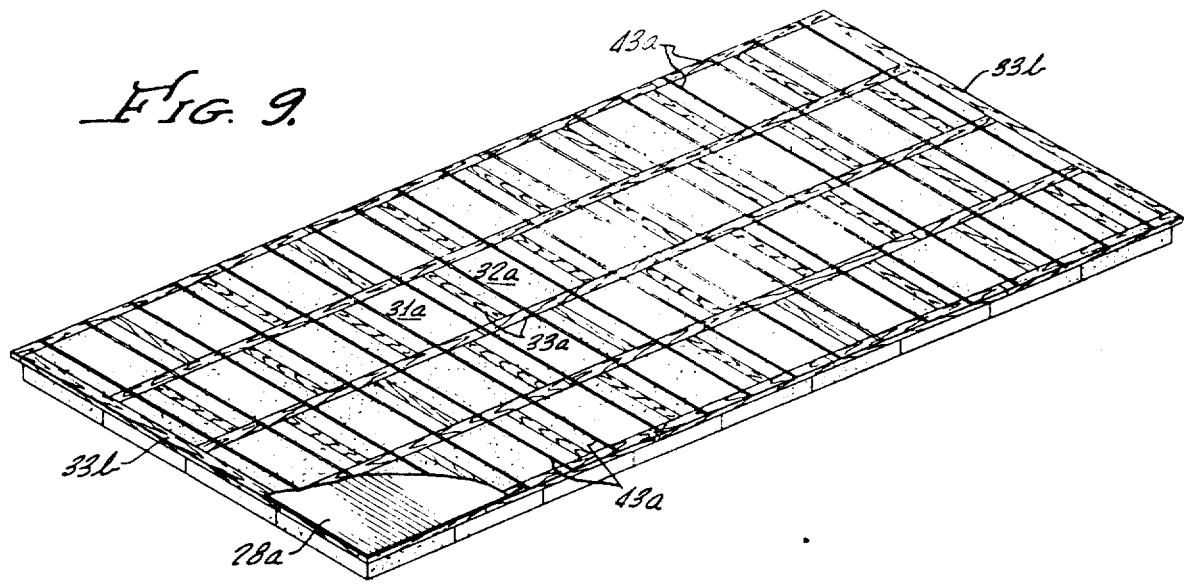
Figure 10:
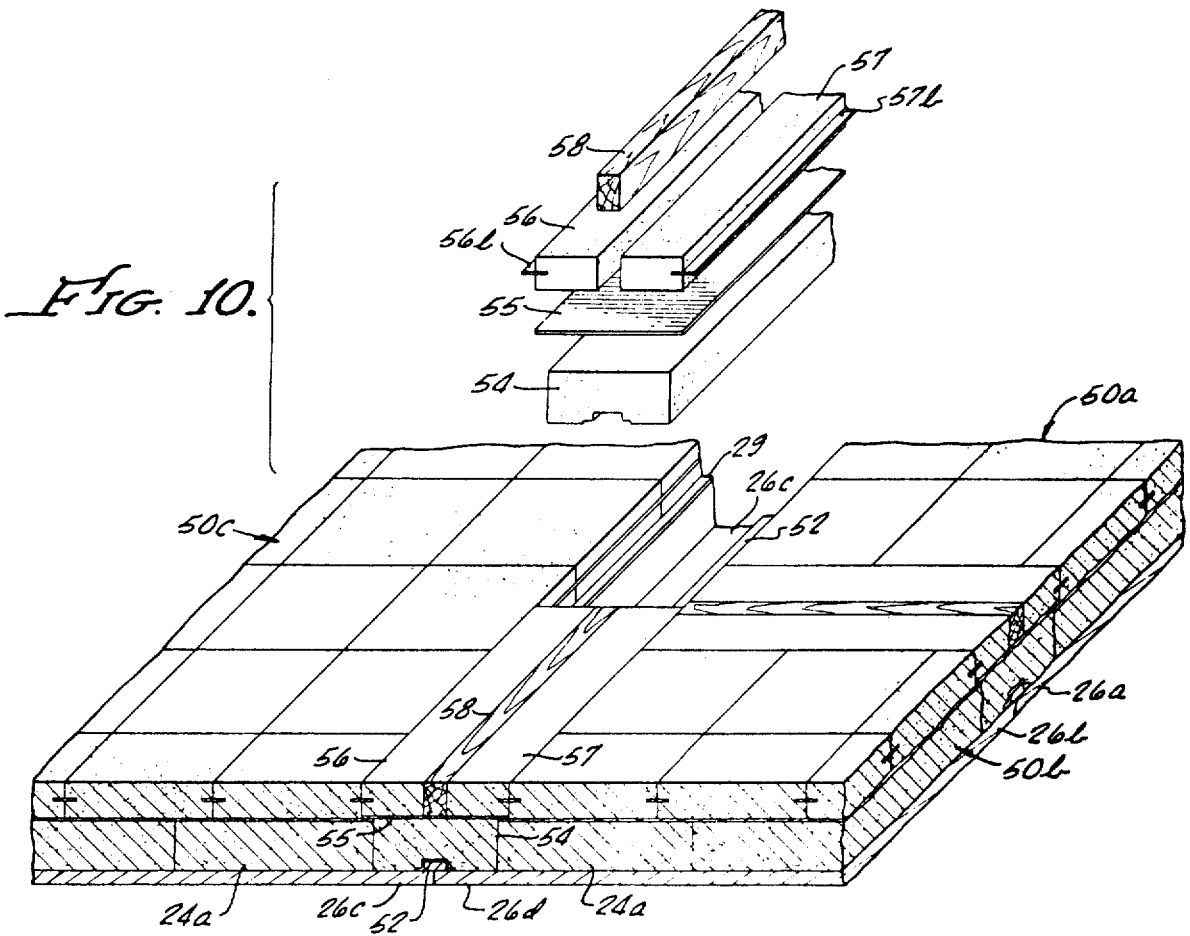
Figure 13:
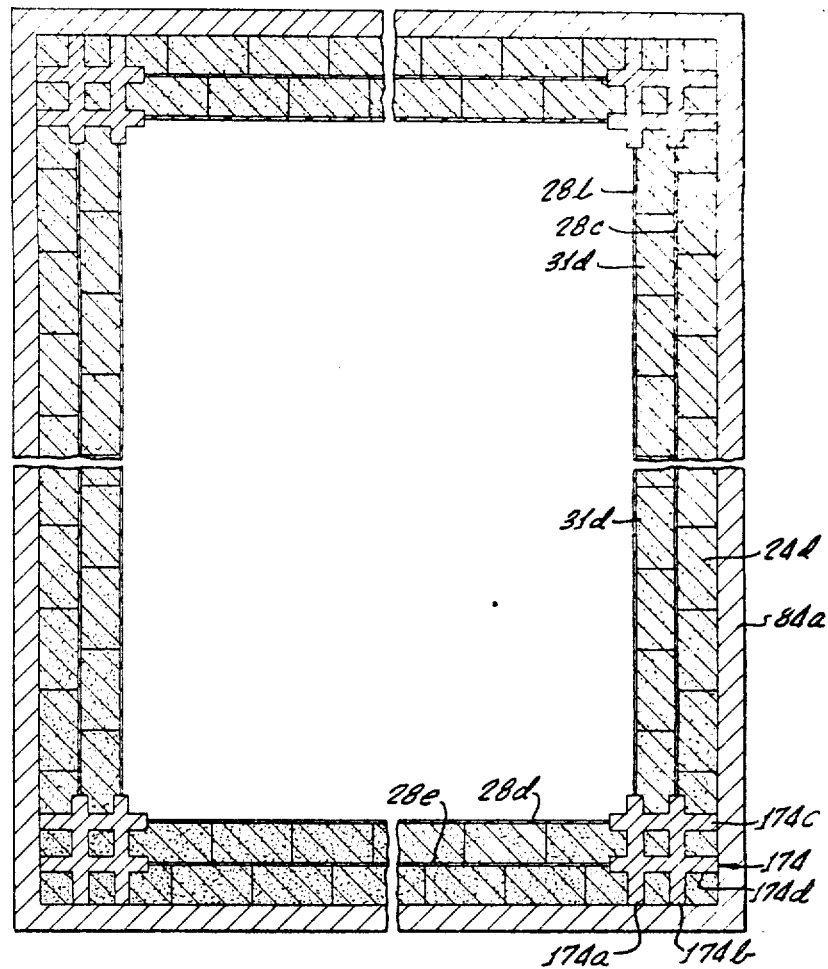
Figure 14:
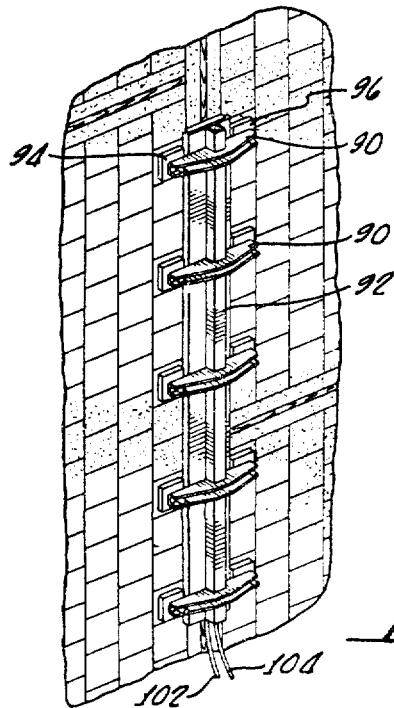
Figure 15:
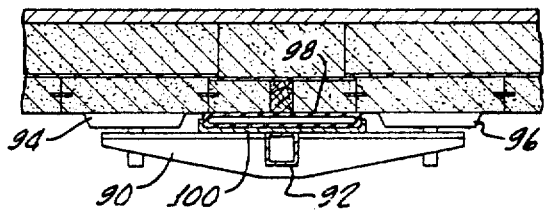

Illustrated in FIGS. 14 and 15 are exemplary bonding tools that may be employed for bonding of the closeout strips to the previously installed modules of the type illustrated in FIGS. 3 and 4. The tool comprises a plurality of adjustable bridges 90 mounted to a main support 92 that extends for at least a substantial portion of the length of one of the modules. Each bridge includes a pair of vacuum cups 94, 96 for attachment to the panels on either side of the closeout strip that is being bonded. A pressure bladder, such as flexible airtight container 98, is carried by a pressure member 100 that extends the length of support 92 and suitable pneumatic hoses 102, 104 are provided to furnish pressurized air to the bladder 98 and to furnish a negative pressure to the several vacuum cups for securement of the pressure tool. The vacuum cups retain the tool to the installed panel and pressurization of the bladder 98 provides appropriate pressure on the closeout strip while the bonding adhesive thereof is curing.

Barrier strip 33a of FIG. 4 performs substantially all of the functions of the barrier strip 33 of FIGS. 2 and 3 and, in addition, performs several additional functions including the provision of further relief of stress. Barrier strip 33a, like the barrier strip 33 of FIGS. 2 and 3, provides a liquid and vapor-tight seal thus completing the primary liquid barrier formed by the stress attenuated inner insulation blocks. It also provides an additional insulation in the thermal path provided by the joint between adjacent blocks. The position of the barrier strip 33a, at the outer (bottom as viewed in FIG. 4) sides of the insulation blocks in contact with the membrane 28a, affords additional strengthening of the joint between the blocks of the membrane. The material of which the barrier strip is formed has a greater strength than the foam of the insulation. An additional and significant function provided by the barrier strip 33a is the attenuation of thermally induced shear stress on the edges of the outer sides of blocks 31a and 32a. It can be shown that shear stresses on the outer surfaces of the blocks 31a and 32a are due to both thermal forces acting on the insulation and to compressive forces such as the pressure due to an overlying head of confined liquid. Consider an insulation block, such as shown in FIG. 4, which is not restrained at its outer surface (the uppermost surface as viewed in FIG. 4) and which is subjected only to thermal forces which are reacted by fixed ends of the block. In such a case, a maximum thermally induced force (a tensile force) will occur at a midpoint of the upper surface of the block. At another extreme, consider the block as subjected to externally applied compressive pressure forces on the top and sides thereof. In such a case, when subjected to such pressure forces alone or in combination with thermal forces, the applied forces are reacted by shear forces at the lower surface of the block and by a force couple at each end. It can be shown that the shear stress component caused by pressure stresses decreases as the thickness of the foam block decreases since the area acted upon by the pressure decreases. Accordingly, with the barrier strip 33a placed at the outer side of the insulation blocks, the thickness of the block effective in creating the shear is effectively decreased and the lower part of the block edge is fixed to the relatively stronger barrier strip. Thus, as a thickness of the barrier strip 33a is increased, the shear stress component due to thermal and pressure forces is reduced. It is found that there exists a thickness of the barrier strip 33a wherein the danger of failure due to thermally induced tension at the center of the upper surface of the block is substantially equal to the danger of failure due to shear stresses at the ends of the lower outer surfaces of the blocks. Thus, the probability of failure due to such thermally and pressure induced shear forces is greatly reduced by employing the illustrated barrier strip 33a positioned at the very bottom or outermost portion of the inner insulation blocks, the strips being bonded at least along outer edges (the vertical sides of the barrier strip as viewed in FIG. 4) to the insulation blocks. As an example, but not by way of limitation, there has been tested an arrangement of 6-pound foam blocks, 12 inches by twelve inches by 3 inches thick, made in the configuration of FIG. 4, with a wood barrier strip three-quarters of an inch thick by one and one-half inches wide. It has been found that a thickness ratio of wood to foam of ¼ - 1/6 is optimum. This arrangement has withstood stresses, both thermal and pressure, that are normally experienced in a liquified gas tanker container.

With the arrangement of the barrier strip as illustrated in FIG. 4 wherein the strip 33a is bonded on all of its surfaces to the membrane and to the foam blocks 31a and 32a at the rabbets thereof, a critical stress point exists at the joint between the foam block and the barrier strip. This point of critical stress is adjacent an outermost portion of the each individual block or more specifically, close to the joint between adjacent blocks. This point of critical stress may be caused to be positioned at a more desirable location, namely, further inwardly of the edge of an individual block (away from the joint between a pair of adjacent blocks) simply by eliminating any bonding between the foam blocks 31a and 31b and the upper surface as viewed in FIG. 4 of the barrier strip 33a. Thus the strip 33a may be bonded along its entire surface of contact with the membrane 28a and also along its edges (extending vertically as viewed in FIG. 4) at their contact surfaces with the foam block rabbets. But no bonding would be employed on the upper surface of the barrier strip.

For further decreases of stress where the upper surface of the barrier strip 33a is in unbonded contact with the rabbets formed in blocks 31a and 32a, a stress relief groove or corner recess (not shown) may be formed at the innermost corner of each rabbet of the blocks to alleviate problems due to stress concentrations at such corners. In addition, the combined stress or strain in the edge of the foam block greatly decreases when the modulus of elasticity (stiffness) of the barrier strip 33a is reduced near that of the foam (5,000 psi).

The configuration of barrier strip shown in FIG. 4 is selected for ease of manufacturing with certain types of block-forming operations. Nevertheless, for purposes of optimum stress conditions, we prefer other shapes of the barrier strip 33a and, concomitantly, of the mating rabbets formed in the blocks 31a and 32a of the inner layer of insulation. For example, the barrier strip may have its outer and upper corner chamfered, assuming a trapezoidal shape or a triangular shape. As indicated at 133a, FIG. 16, a triangular barrier strip mates with corresponding triangular cuts, indicated at 134a and 134b, in the lower outside edges of adjoining foam blocks 131a and 132a of the inner layer of insulation. The barrier strip 133a, as in the embodiment of FIG. 4, is bonded on all its furfaces to the foam blocks 131a and 132a and to the membrane 128a. As previously described, abutting edge surfaces of foam blocks 131a and 132a are not bonded to each other but are free to move with temperature-induced contraction.

Figure 17:
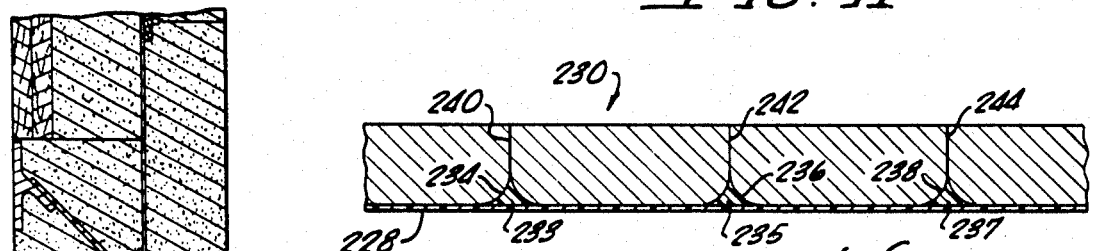
FIG. 17 illustrates still another modification of the module joint barrier of FIG. 4.
Figure 16:
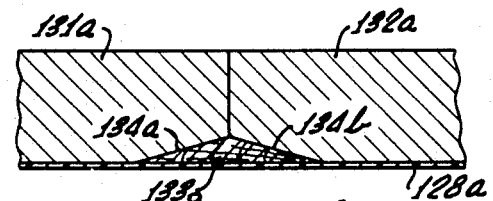
FIG. 16 illustrates a modification of the module joint barrier shown in FIG. 4.

The triangular configuration of FIG. 16 is not optimum (from the standpoint of stress relief at this part of the structure) but rather, it is a compromise with an optimum exponentially, circularly or hyperbolically curved configuration, such as illustrated in the modification of FIG. 17. In this modification, individual blocks are formed with the lower edges contoured so that a plurality of curved grooves or depressions 234, 236 and 238 is formed in a grid pattern when the blocks are placed next to one another. These depressions take the form of the nearly triangular (in cross section) recesses formed by the pair of mating triangular chambers or recesses 134a and 134b of the arrangement of FIG. 16, except that the sides of these recesses are curved, circularly, exponentially or hyperbolically, as indicated in the drawing. Such curvature may be more precisely calculated or empirically determined for optimum stress relief at this point of the assembly. After the blocks are placed next to one another, the barrier strips 233, 235 and 237, formed of wood or other suitably strong material shaped to mate with the grooves 234, 236 and 238, are bonded in place, being bonded to the sides of the grooves and bonded to the membrane 228.

The foregoing detailed description is to be clearly understood as given by way of illustration and example only, the spirit and scope of this invention being limited solely by the appended claims.

What is claimed is:

1. A multilayer insulation system comprising
    a first layer of cellular foam,
    a liquid-impervious membrane attached to the inner surface of said first layer,
    a second layer of cellular foam having one surface attached to the inner surface of said membrane, said second layer of foam comprising a plurality of foam blocks attached to said membrane in edge-to-edge abutment with one another, and means for forming an expansion joint between adjacent ones of said foam blocks of said second layer, said means for forming an expansion joint comprising
    a pair of mating rabbets formed in adjacent edges of outer surfaces of adjacent blocks of said second layer,
    a barrier strip mounted within said mating rabbets between the blocks of said second layer and said membrane, and means for sealing said barrier strip to the contacting surfaces of said membrane and blocks of said second layer, whereby the blocks of the second layer are free to spread apart for the major portion of their thickness but remain sealed to each other by the barrier strip at the outermost portion thereof in contact with the membrane.

2. A thermal insulation and liquid barrier system comprising
    a membrane,
    a layer of insulation bonded to the membrane, said layer of insulation comprising a plurality of foam blocks in edge-to-edge abutment with one another, and
    means for forming an expansion joint between adjacent ones of said foam blocks, said means for forming an expansion joint comprising means for sealing adjacent blocks to one another solely at portions of the abutting edge surfaces thereof that are adjacent said membrane.

3. The system of claim 2 wherein said means for forming an expansion joint comprises pairs of cooperating grooves formed in surfaces of adjacent blocks that are in contact with said membrane, said grooves bridging the joint between adjacent blocks, and barrier strips positioned in pairs of said grooves and bonded to said membrane and to walls of the grooves in liquid sealing relation thereto.

4. The system of claim 3 wherein said barrier strips are of substantially rectangular cross section.

5. The system of claim 3 wherein said barrier strips are of substantially triangular cross section.

6. The system of claim 3 wherein said cooperating grooves are formed by outwardly convex chamfered corners of said blocks.

7. The system of claim 3 wherein said barrier strips are formed of a material having a strength greater than the strength of the foam blocks.

8. The system of claim 3 wherein said barrier strips are ¼ to 1/6 the thickness of said foam blocks.

9. The system of claim 3 wherein said barrier strips have a low modulus of elasticity.

10. A thermal insulation and liquid barrier system comprising:
    a membrane,
    a layer of insulation bonded to the membrane, said layer of insulation comprising a plurality of foam blocks in edge-to-edge abutment with one another, and
    means for increasing stress resistance of corners of the blocks adjacent said membrane, said means for increasing stress resistance comprising means for strengthening corners of the blocks.

11. The insulation system of claim 10 wherein said means for increasing stress resistance includes recesses formed in corners of the blocks adjacent the membrane, and barrier strips positioned in corresponding and mating recesses formed at adjacent blocks and bonded to and between the blocks and the membrane, said strips having greater stress resistance than said blocks.

* * * * *

UNITED STATES PATENT OFFICE
CERTIFICATE OF CORRECTION

Patent No. 3,931,424                    Dated January 6, 1976

Inventor(s)  Jack C. Helf                            Page 1 of 7

It is certified that error appears in the above-identified patent and that said Letters Patent are hereby corrected as shown below:

Insert Sheets 1 to 6, containing Figures 1 to 17, as part of Letters Patent:

Signed and Sealed this thirtieth Day of March 1976

[SEAL]

Attest:

RUTH C. MASON
Attesting Officer

C. MARSHALL DANN
Commissioner of Patents and Trademarks

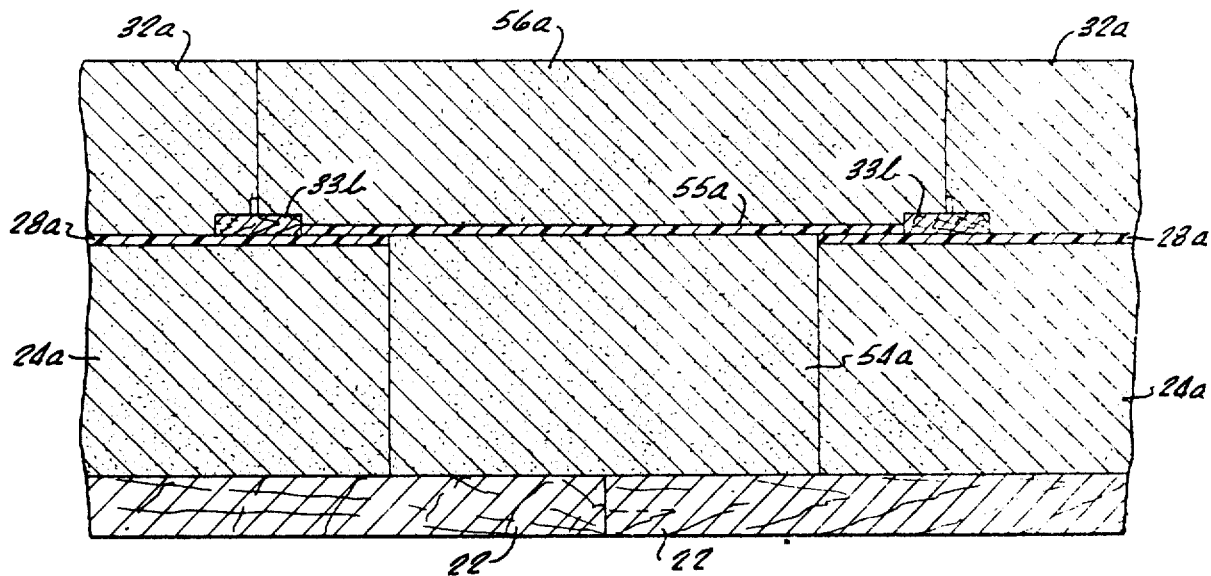
FIG. 11
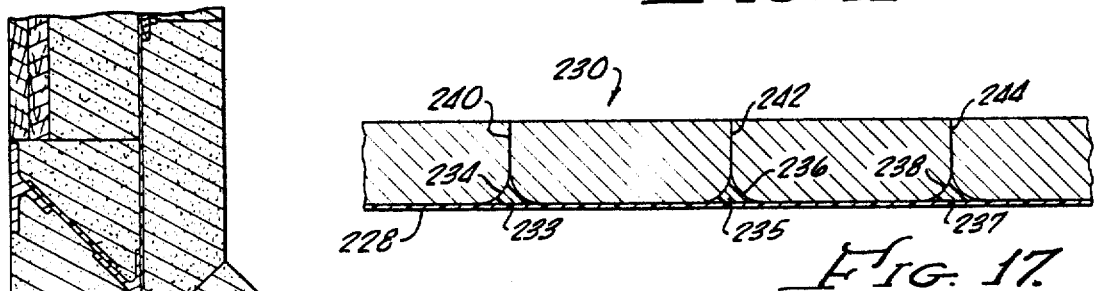
FIG. 17
FIG. 16
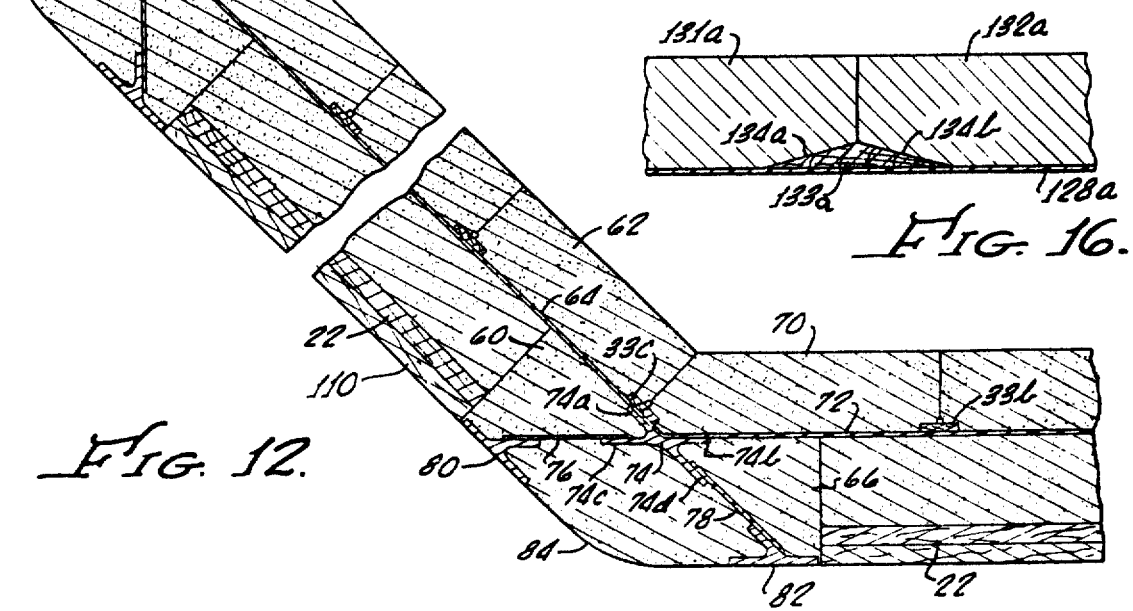
FIG. 12